United States Patent [19]
Eguchi et al.

[11] Patent Number: 5,950,978
[45] Date of Patent: Sep. 14, 1999

[54] POWER SEAT SLIDE DEVICE FOR MOTOR VEHICLE

[75] Inventors: Moriyuki Eguchi; Nobuyuki Nakano, both of Kanagawa; Tomonori Yoshida, Yokohama, all of Japan

[73] Assignee: Ikeda Bussan Co., Ltd., Ayase, Japan

[21] Appl. No.: 08/965,524

[22] Filed: Nov. 6, 1997

[30] Foreign Application Priority Data

Nov. 12, 1996 [JP] Japan ..................... 8-300522
Nov. 12, 1996 [JP] Japan ..................... 8-300537

[51] Int. Cl.⁶ ..................................... F16M 13/00
[52] U.S. Cl. ........................... 248/429; 297/344.1
[58] Field of Search ............... 74/89.14, 89.15; 248/429; 297/344.1; 296/65.01

[56] References Cited

U.S. PATENT DOCUMENTS

| | | | |
|---|---|---|---|
| 4,805,866 | 2/1989 | Aihara et al. | 248/429 |
| 5,048,786 | 9/1991 | Tanaka et al. | 248/429 |
| 5,144,849 | 9/1992 | Aihara et al. | 74/89.14 |
| 5,150,872 | 9/1992 | Isomura | 248/429 |
| 5,259,257 | 11/1993 | Mouri | 74/89.15 |
| 5,314,158 | 5/1994 | Mouri | 248/429 |
| 5,765,798 | 6/1998 | Isomura | 248/429 |
| 5,823,499 | 10/1998 | Ito et al. | 248/429 |

FOREIGN PATENT DOCUMENTS 1-99734  7/1989  Japan.

*Primary Examiner*—Milton Nelson, Jr.
*Attorney, Agent, or Firm*—Foley & Lardner

[57] ABSTRACT

A power seat slide device for a motor vehicle comprises a rail unit including a stationary rail mounted to a vehicle floor and a movable rail slidably engaged with the stationary rail. The movable rail carries thereon a seat. A twin gear member is rotatably held by the movable rail. The twin gear member includes a worm gear and a first crossed helical gear. An elongate counterpart structure for the worm gear is possessed by the stationary rail. The counterpart structure extends along the stationary rail and is meshedly engaged with the worm gear, so that rotation of the twin gear member about its axis induces a straight-line movement of the movable rail relative to the stationary rail. An electric motor is held by the movable rail. A speed reduction gear unit is held by the movable rail. The speed reduction gear unit is arranged between the electric motor and the first crossed helical member in such a manner that the twin gear member is rotated by the electric motor through the speed reduction gear unit.

17 Claims, 9 Drawing Sheets

POWER SEAT SLIDE DEVICE FOR MOTOR VEHICLE

BACKGROUND OF THE INVENTION

1. Field of the Invention

The present invention relates in general to power seat slide devices for motor vehicles, and more particularly to power seat slide devices of a type which generally comprises a stationary rail fixed to a vehicle floor, a movable rail movable on the stationary rail and carrying thereon a seat, a gear member held by one of the stationary and movable rails, a counter member of the gear member held by the other of the stationary and movable rails and engaged with the screw shaft, and an electric motor for driving or turning either one of the gear member shaft and the counter member.

2. Description of the Prior Art

Hitherto, various power seat slide devices for motor vehicles have been proposed and put into practical use. One of the conventional devices is described in Japanese Utility Model First Provisional Publication 1-99734.

Some of the devices are of a type which generally comprises a stationary rail fixed to a vehicle floor, a movable rail movable on the stationary rail and carrying thereon a seat, a screw shaft held by one of the stationary and movable rails, a nut held by the other of the stationary and movable rails and engaged with the screw shaft, and an electric motor for driving or turning either one of the screw shaft and the nut. A wire harness extends between the electric motor and an electric power source. Upon energization of the electric motor, relative displacement between the screw shaft and the nut changes causing movement of the movable rail relative to the stationary rail. With this, the seat is moved to a new fore-and-aft position relative to the vehicle floor.

However, due to inherent construction, the power seat slide devices of the above-mentioned type tend to have the following drawbacks.

First, due to usage of a lengthy screw shaft, it is difficult to provide the power seat slide device with a compact construction. Furthermore, due to the same reason, mounting of the screw shaft to the stationary or movable rail is troublesome and thus takes a greater assembly time, resulting in greater cost. In fact, it is difficult or at least troublesome to properly engage the screw shaft with the nut. That is, the screw shaft should be accurately arranged in parallel with the movable or stationary rail to which the nut is secured. If such parallel arrangement is not properly made, smoothed movement of the movable rail relative to the stationary rail is not achieved. Although this drawback may be solved when the length of the screw shaft is reduced, the moving range of the seat becomes limited correspondingly.

Second, the wire harness of the electric motor is lengthy. The lengthy wire harness tends to produce an unsightly loosened portion when the seat comes to one of frontmost and rearmost positions. The loosed portion has such an undesirable possibility as to abruptly catch the foot of a passenger who is willing to take or leave the seat.

SUMMARY OF THE INVENTION

It is therefore an object of the present invention to provide a power seat slide device for a motor vehicle, which is free of the above-mentioned drawbacks.

According to the present invention, there is provided a power seat slide device for a motor vehicle, which comprises a rail unit including a stationary rail adapted to be mounted to a floor of the vehicle and a movable rail slidably engaged with the stationary rail, the movable rail carrying thereon a seat; a worm gear rotatably held by the movable rail; an elongate counterpart structure of the worm gear possessed by the stationary rail, the counterpart structure extending along the stationary rail and meshedly engaged with the worm gear, so that rotation of the worm gear about its axis induces a straight-line movement of the movable rail relative to the stationary rail; an electric motor held by the movable rail; and a speed reduction gear unit held by the movable rail, the speed reduction gear unit being arranged between the electric motor and the worm gear in such a manner that the worm gear is rotated by the electric motor through the speed reduction gear unit.

BRIEF DESCRIPTION OF THE DRAWINGS

Other objects of the present invention will become apparent from the following description when taken in conjunction with the accompanying drawings, in which.

DETAILED DESCRIPTION OF THE EMBODIMENTS

In the following, various embodiments of the present invention will be described in detail with reference to the accompanying drawings. The terms, such as "right", "left", "front", "rear", "forward", "rearward" and the like are to be understood with respect to a passenger properly sitting on a seat.

Figure 1:
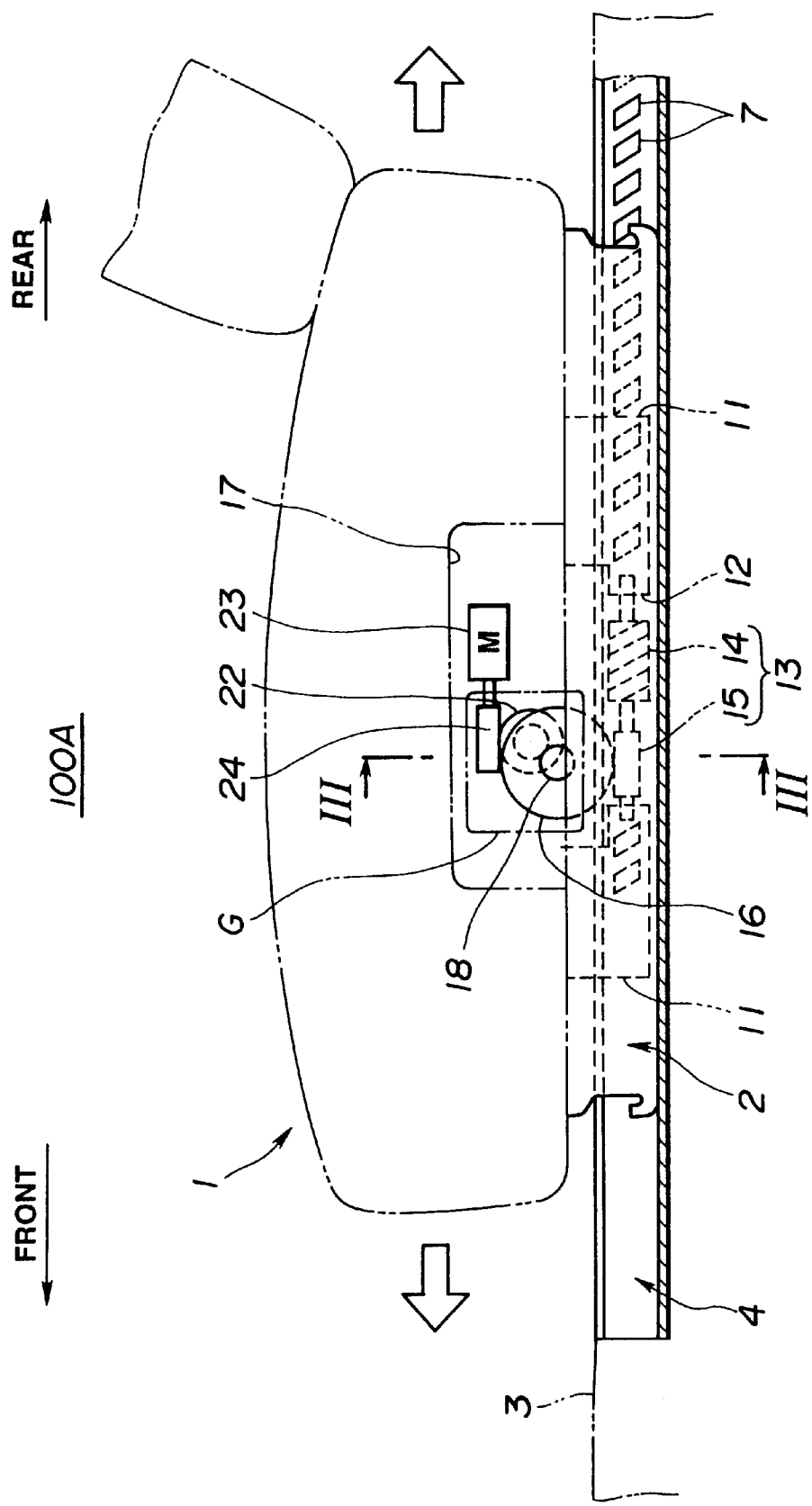
FIG. 1 is a partially sectioned side view of a power seat slide device which is a first embodiment of the present invention.

Referring to FIGS. 1 to 4, particularly FIG. 1, there is shown a power seat slide device 100A which is a first embodiment of the present invention.

In FIG. 1, denoted by numeral 1 is a seat which has a pair of movable rails 2 fixed to a lower surface thereof. The movable rails 2 are movably engaged with a pair of stationary rails 4 which are fixed to a vehicle floor 3. Thus, the seat 1 is movable in fore-and-aft directions relative to the vehicle floor 3.

Figure 3:
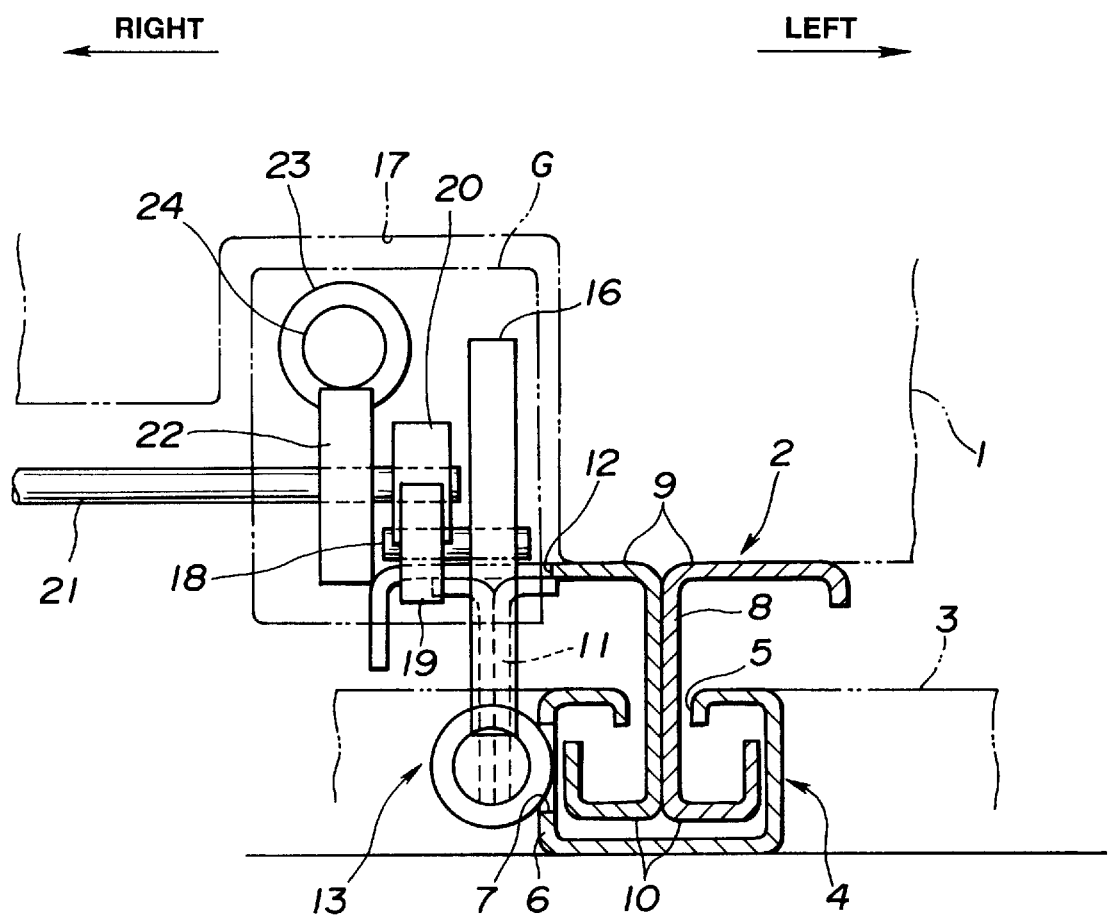
FIG. 3 is a sectional view taken along the line III—III of FIG. 1.

As is seen from FIG. 3, each stationary rail 4 has at its upper wall an axially extending slit 5.

The stationary rail 4 is entirely received in a groove of the vehicle floor 3 so that the upper wall of the stationary rail 4 is flush with a major surface of the vehicle floor 3. This flat-surface structure brings about not only improvement in external appearance of the seat slide device 100A but also safety to passengers. The axially extending slit 5 of the stationary rail 4 is sized so that a heel of high-heeled shoe cannot accidentally slip thereinto. By narrowing the slit 5, entering of foreign things into an inner space of the stationary rail 4 is suppressed or at least minimized.

Figure 4:
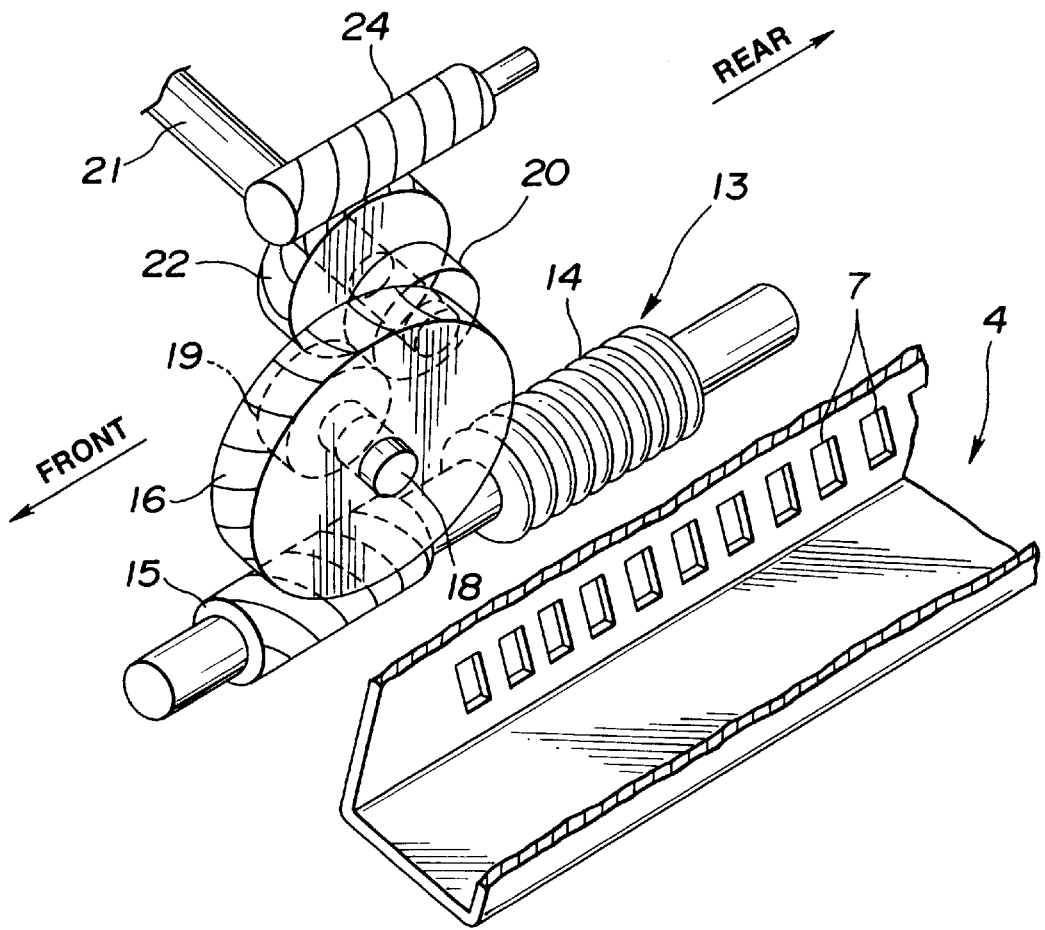
FIG. 4 is a perspective view of an essential portion of the power seat slide device of the first embodiment, showing a twin gear member having a worm gear and a first crossed helical gear, a second crossed helical gear and their surrounding parts.

As is seen from FIGS. 3 and 4, each stationary rail 4 is formed at its inside wall 6 with a plurality of aligned openings 7 which are equally spaced from one another. As is seen from FIGS. 1 and 3, the openings 7 are slanted.

As is seen from FIG. 3, each movable rail 2 is constructed by coupling two elongate members in a back-to-back connecting manner. As shown, the movable rail 2 comprises a vertical wall portion 8, an upper horizontal wall portion 9 and a lower horizontal wall portion 10. Each of the upper and lower horizontal wall portions 9 and 10 has flanges at lateral ends thereof.

Under engagement of the stationary and movable rails 4 and 2, the lower horizontal wall portion 10 of the movable rail 2 is received in the space defined in the stationary rail 4 having the vertical wall portion 8 of the movable rail 2 spacedly received in the slit 5 of the stationary rail 4.

Although not shown in the drawing, bearing rollers are put between a bottom wall of the stationary rail 4 and the lower horizontal wall portion 10 of the movable rail 2, and bearing balls are put between lower horizontal wall portion 10 of the movable rail 2 and the upper wall of the stationary rail 4. With these rollers and balls, the fore-and-aft movement of the movable rail 2 relative to the stationary rail 4 is smoothly carried out.

As is seen from FIG. 3, the upper horizontal wall portion 9 of the movable rail 2 has at its inside part a vertical wall member 11 suspending therefrom.

The vertical wall member 11 has at its lower part an axially extending cut-out portion 12 into which a twin gear member 13 (see FIG. 4) is rotatably received. As may be seen from FIG. 1, axially opposed ends of the twin gear member 13 are rotatably supported by front and rear portions of the vertical wall member 11 of the movable rail 2.

As is seen from FIG. 4, the twin gear member 13 comprises a worm gear 14 and a first crossed helical gear 15 which are coaxially aligned. The worm gear 14 is operatively meshed with the openings 7 of the stationary rail 4.

The first cross helical gear 15 is operatively engaged with a second crossed helical gear 16 which constitutes a part of a speed reduction gear unit "G" (see FIG. 1).

As is understood from FIG. 1, the speed reduction gear unit "G" is installed in a recess 17 formed in a lower portion of the seat 1.

As is seen from FIG. 4, the second crossed helical gear 16 is tightly disposed on a shaft 18 which extends perpendicular to the axis of the twin gear member 13, that is, perpendicular to the direction in which the seat 1 moves.

As is understood from FIG. 4, the shaft 18 has further a smaller diameter gear 19 tightly disposed thereon. The gear 19 is meshed with another gear 20. The gear 20 is tightly disposed on a shaft 21 which extends in parallel with the shaft 18. The shaft 21 further has a worm wheel 22 tightly disposed thereon. The worm wheel 22 is operatively engaged with a worm gear 24 which is driven by an electric motor 23 (see FIG. 1) mounted to the seat 1.

Figure 2:
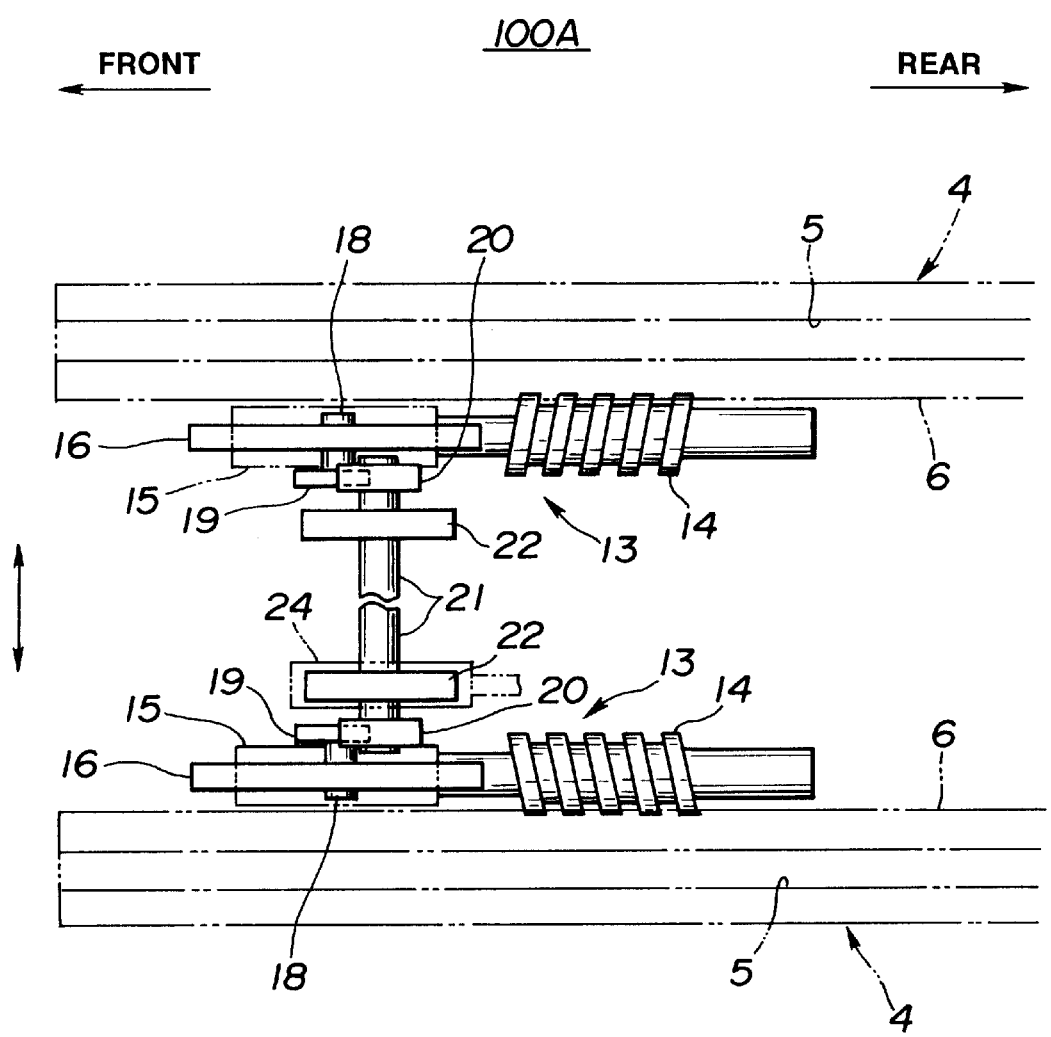
FIG. 2 is a plan view of the power seat slide device of the first embodiment.

As will be understood from FIG. 2, the shaft 21 extends toward another rail unit (viz., right rail unit) and has another worm wheel (22) at its right end. That is, the other worm wheel (22) is practically used when the electric motor 23 is incorporated with the right rail unit. However, the worm wheel (22) is not needed when the electric motor 23 is incorporated with the left rail unit as in the illustrated case.

The speed reduction gear unit "G" thus comprises the worm wheel 16, the gears 19 and 20, the worm wheel 22 and the worm gear 24.

In the following, operation will be described with reference to the drawings, particularly FIGS. 1 and 4.

When, upon energization of the electric motor 23, the worm gear 24 is rotated, the rotation of the worm gear 24 is transmitted to the twin gear member 13 to rotate the same. Due to engagement of the worm gear 14 with the openings 7 of the stationary rail 4, the rotation of the twin gear member 13 induces a forward or rearward movement of the movable rail 2 relative to the stationary rail 4, that is, a forward or rearward movement of the seat 1 relative to the vehicle floor 3. When energization of the motor 23 stops, the seat 1 is stopped at a position. That is, by controlling the electric motor 23 in ON/OFF manner, the position of the seat 1 is adjusted.

In the following, advantages of the above-mentioned first embodiment 100A will be described.

First, because of usage of a compact power transmission mechanism including the twin gear member 13 operatively engaged with the openings 7 of the stationary rail 4, the power seat slide device 100A can have a compact construction. That is, the lengthy screw shaft is not used in this embodiment.

Second, the power transmission mechanism including the twin gear member 13 engaged with the openings 7 of the stationary rail 4 can provide the power seat slide device 100A with a robust structure. That is, due to its nature, operative engagement between the twin gear member 13 and the openings 7 can bear against a marked shock applied thereto upon a vehicle collision or the like.

Third, it is easy to achieve an operative engagement between the twin gear member 13 (more specifically, the worm gear 14) and the openings 7 of the stationary rail 4. That is, even if some of the spiral gear sections of the worm gear 14 of the twin gear member 13 fail to properly engage with the openings 7 due to poor parallel arrangement between the twin gear member 13 and the stationary rail 4, the operative engagement therebetween can be kept by remaining spiral gear sections of the worm gear 14.

Fourth, the moving range of the seat 1 is easily increased by only increasing the number of the openings 7 of the stationary rail 4.

Fifth, if the stationary and movable rails 4 and 2 and the twin gear member 13 are preassembled and the speed reduction gear unit "G" is previously mounted in the seat 1, mounting of the seat 1 onto the two rail units is easily carried out. That is, when the seat 1 is put on the movable rails 2 of the two rail units, the worm wheel 16 of the reduction gear unit "G" is automatically engaged with the first crossed helical gear 15 of the twin gear member 13.

Figure 5:
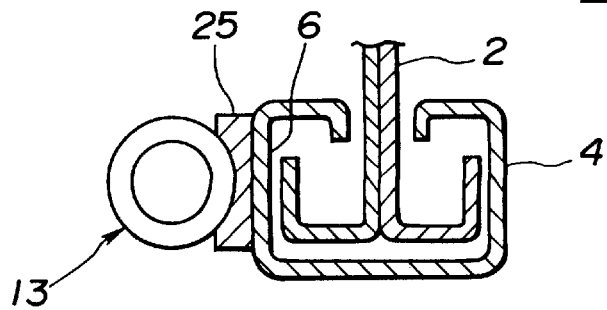
FIG. 5 is a sectional view of a rail unit which constitutes a part of a power seat slide device of a second embodiment of the present invention.

Referring to FIG. 5, there is shown a rail unit which constitutes a part of a power seat slide device 100B of a second embodiment of the present invention. The device 100B is substantially the same as the above-mentioned device 100A of the first embodiment except for the illustrated rail unit.

In this second embodiment, a rack member 25 secured to the inside wall 6 of the stationary rail 4 is used in place of the openings 7 of the first embodiment. That is, the rack member 25 has a plurality of slanted grooves operatively engaged with the worm gear 14 of the twin gear member 13. The advantages of the first embodiment are also possessed by this second embodiment.

Referring to FIGS. 6 to 9, there is shown a power seat slide device 100C which is a third embodiment of the present invention.

Since the device 100C of this third embodiment is similar in construction to the device 100A of the above-mentioned first embodiment, detailed description will be directed to only parts and construction which are different from those of the first embodiment 100A, and substantially the same parts and construction are denoted by the same numerals.

Figure 8:
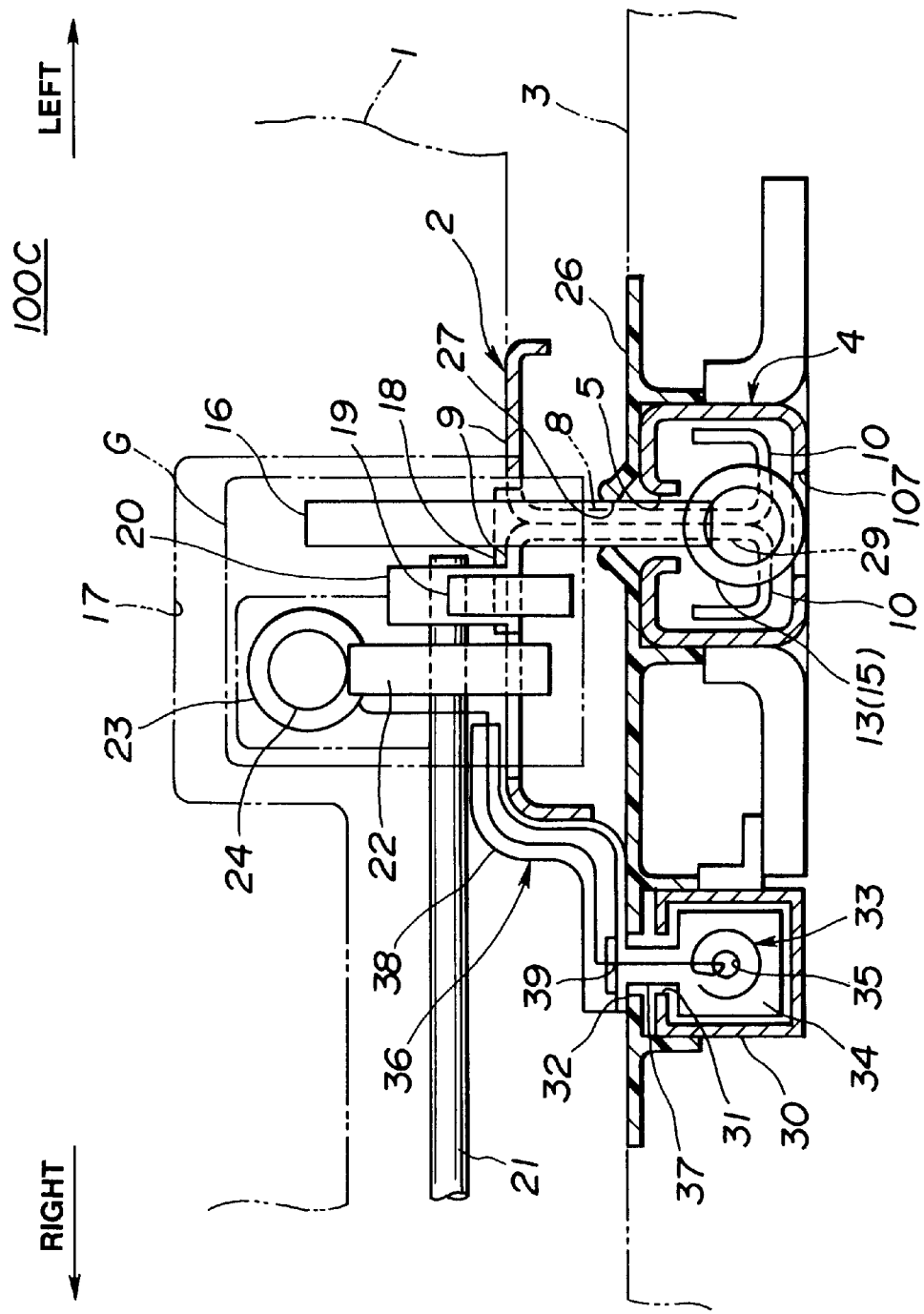
FIG. 8 is a sectional view taken along the line VIII—VIII of FIG. 6.

As shown in FIG. 8, the stationary rail 4 is entirely received in a groove of a vehicle floor 3. A plastic cover 26 is put on the vehicle floor 3, which has a slit 27 extending along the slit 5 of the stationary rail 4. Due to provision of the plastic cover 26, external appearance of the vehicle floor 3 is improved.

Figure 6:
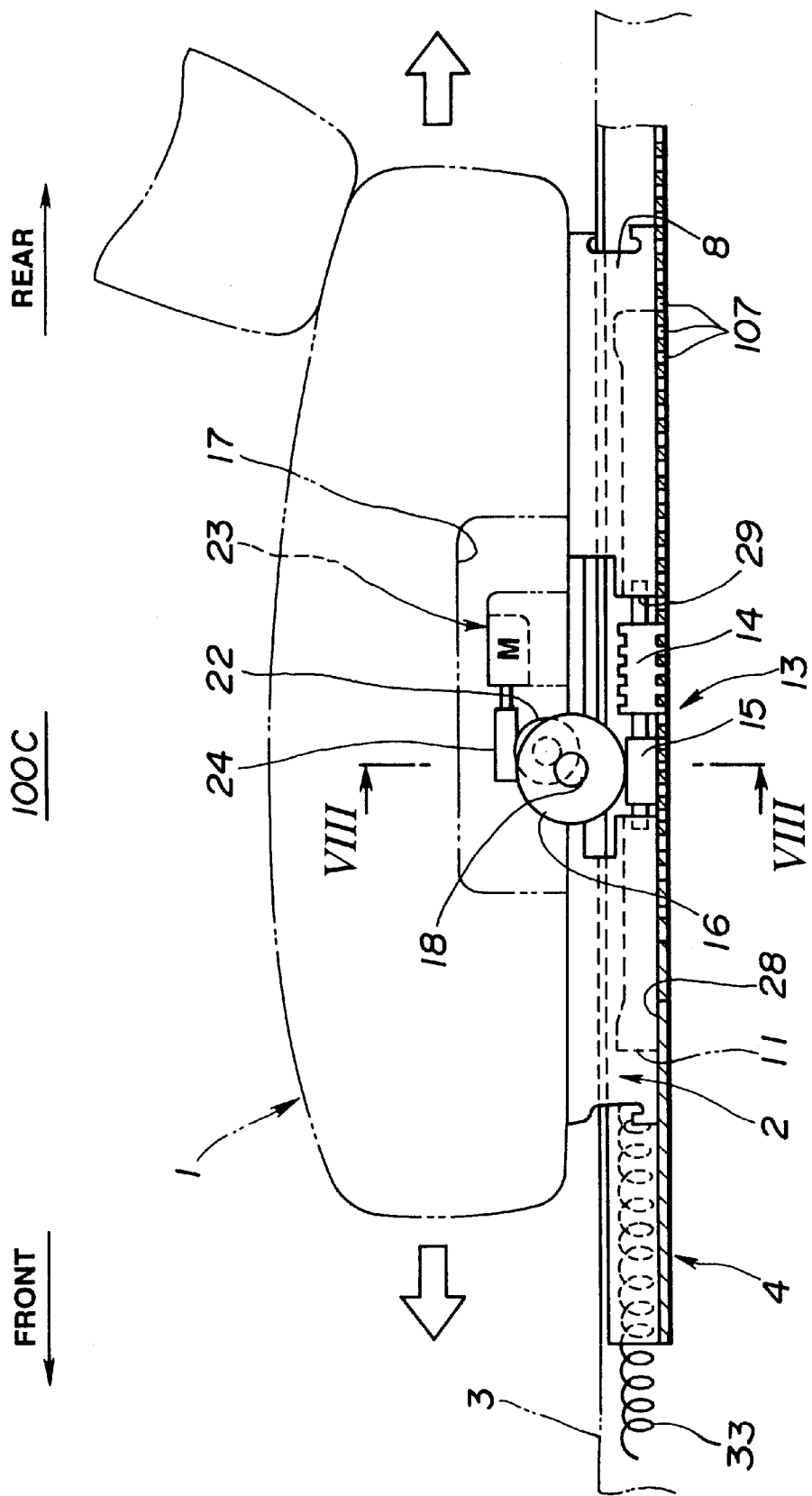
FIG. 6 is a view similar to FIG. 1, but showing a third embodiment of the present invention.
Figure 7:
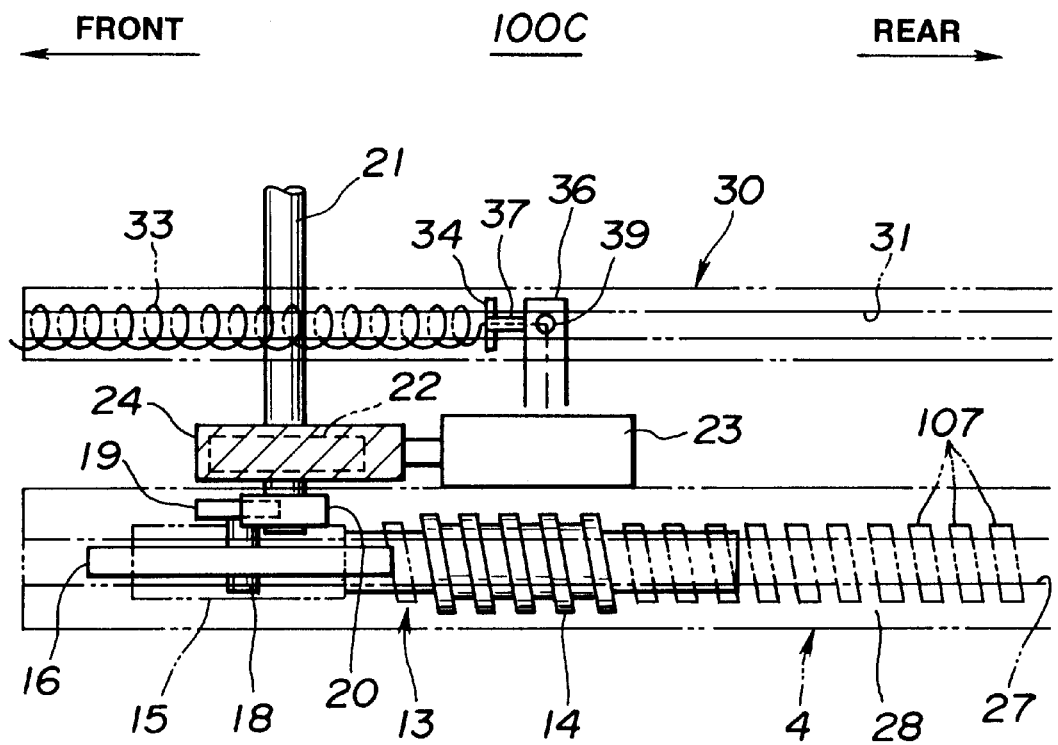
FIG. 7 is a plan view of the power seat slide device of the third embodiment.

As is seen from FIGS. 6, 7 and 8, each stationary rail 4 is formed at its bottom wall 28 with a plurality of aligned openings 107 which are equally spaced from one another. The openings 107 of each rail 4 are slanted relative to an axial direction of the rail 4.

It is to be noted that the slanted openings 107 of respective stationary rails 4 are symmetrically arranged with respect to an imaginary center line therebetween.

As is seen from FIG. 8, similar to the device 100A of the above-mentioned first embodiment, each movable rail 2 is constructed by coupling two elongate members in a back-to-back connecting manner. Each of the upper and lower horizontal wall portions 9 and 10 of the movable rail 2 has flanges at lateral ends thereof.

Under engagement of the stationary and movable rails 4 and 2, the lower horizontal wall portion 10 of the movable rail 2 is received in the space defined in the stationary rail 4 having the vertical wall portion 8 of the movable rail 2 spacedly received in the slit 5 of the stationary rail 4. Similar to the case of the first embodiment 100A, bearing rollers and bearing balls are received in the space of the stationary rail 4 to smooth the movement of the movable rail 2 relative to the stationary rail 4.

As is understood from FIGS. 6 and 8, the movable rail 2 has at its lower part an axially extending cut-out portion 29 into which a twin gear member 13 is rotatably received. As may be seen from FIG. 6, axially opposed ends of the twin gear member 13 are rotatably supported by front and rear portions of the vertical wall portion 8 of the movable rail 2.

As is seen from FIGS. 6 and 7, the twin gear member 13 comprises a worm gear 14 and a first crossed helical gear 15 which are coaxially aligned. The worm gear 14 is operatively meshed with the openings 107 of the stationary rail 4.

The first crossed helical gear 15 is operatively engaged with a second crossed helical gear 16 which constitutes part of a speed reduction gear unit "G".

As is seen from FIG. 8, the second crossed helical clear 16 has a peripheral portion put through the merged slits 27 and 5 into the space of the stationary rail 4 to engage with the first crossed helical gear 15 of the twin gear member 13. As shown, inclined edges of the plastic cover 26, which define the slit 27, are in contact with opposed surfaces of the second crossed helical gear 16.

As is understood from FIG. 6, the speed reduction gear unit "G" is installed in a recess 17 formed in a lower portion of the seat 1.

As is seen from FIGS. 7 and 8, the second crossed helical gear 16 is tightly disposed on a shaft 18 which extends perpendicular to the axis of the twin gear member 13, that is, perpendicular to the direction in which the seat 1 moves.

As is best seen from FIG. 7, the shaft 18 has further a smaller diameter gear 19 tightly disposed thereon. The gear 19 is meshed with another gear 20. The gear 20 is tightly disposed on a shaft 21 which extends in parallel with the shaft 18, The shaft 21 further has a worm wheel 22 tightly disposed thereon. The worm wheel 22 is operatively engaged with a worm gear 24 which is driven by an electric motor 23.

Similar to the case of the first embodiment 100A, the shaft 21 extends toward another rail unit (viz., right rail unit).

The speed reduction gear unit "G" comprises the worm wheel 16, the gears 19 and 20, the worm wheel 22 and the worm gear 24.

When, in operation, the worm gear 24 is rotated due to energization of the electric motor 23, the rotation of the worm gear 24 is transmitted to the twin gear member 13 to rotate the same. Due to operative engagement of the twin gear member 13 (more specifically, the worm gear 14) with the openings 107 of the stationary rail 4, the rotation of the twin gear member 13 induces a forward or rearward movement of the movable rail 2 relative to the stationary rail 4, that is, a forward or rearward movement of the seat 1 relative to the vehicle floor 3. When energization of the motor 23 stops, the seat 1 is stopped at a position. That is, by controlling the electric motor 23 in ON/OFF manner, the position of the seat 1 is adjusted.

In the third embodiment 100C, the following arrangement is further employed for electrically connecting the electric motor 23 with an electric power source (not shown).

As is shown in FIG. 8, the vehicle floor 3 is formed near the groove for the stationary rail 4 with another groove in which a harness receiving channel member 30 is tightly installed. The harness receiving channel member 30 has a slit 31 at its upper wall, which extends along the same. The harness receiving channel member 30 extends in parallel with the stationary rail 4. As shown, the plastic cover 26 has a slit 32 which is exposed to an interior of the harness receiving channel member 30 and extends along the same.

Figure 9:
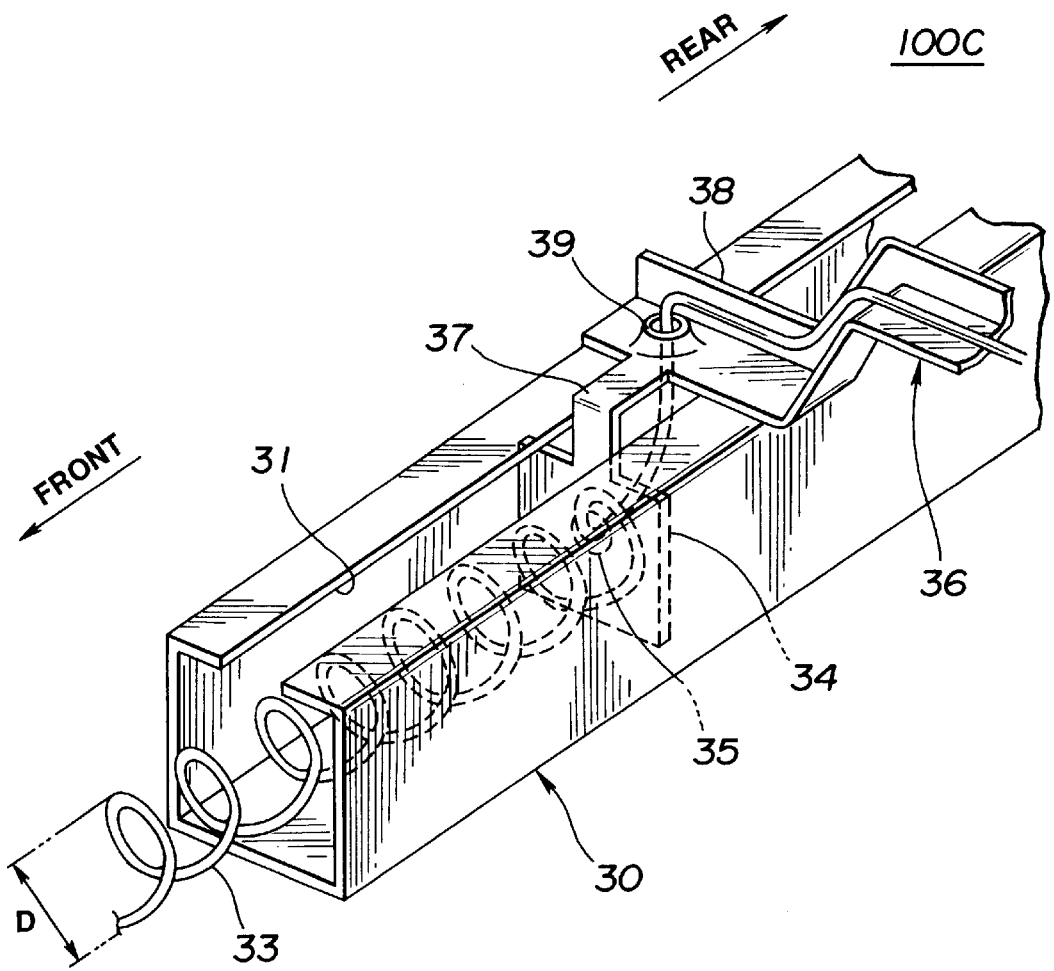
FIG. 9 is a perspective view of an essential portion of the power seat slide device of the third embodiment, showing a wire harness, a bracket and their surrounding parts.

As is well shown in FIG. 9, within the harness receiving channel member 30, there is an axially movably installed wire harness 33. The wire harness 33 is of a spiral type and each spiral thereof has a diameter of "D". The spiral wire harness 33 is thus longitudinally expandable in the harness receiving channel member 30.

Within the harness receiving channel member 30, there is further arranged a rectangular plate 34 which has a small opening 35 through which the wire harness 33 passes. The rectangular plate 34 is integrally connected to a cranked bracket 36 through a bent strip portion 37 which is received in the slit 31 of the harness receiving channel member 30.

As shown in FIG. 8, the cranked bracket 36 is secured to the upper horizontal wall portion 9 of the movable rail 2 at a position where the electric motor 23 is arranged.

Referring back to FIG. 9, the cranked bracket 36 is formed at its rear end with a raised flange 38 and at a portion near the bent strip portion 37 with an opening 39 through which the wire harness 33 extends to the outside. The wire harness 33 from the opening 39 extends along the cranked bracket 36 and is connected to the electric motor 23. The other end of the wire harness 33 is connected to the power source. It is to be noted that in this case the chassis of the vehicle serves as another conductive means between the motor 23 and the power source.

Thus, when the seat 1 is moved forward or rearward upon energization of the electric motor 23, the rectangular plate 34 is moved in the same direction while compressing or expanding the spiral wire harness 33 in the harness receiving channel member 30.

In the above-mentioned third embodiment 100C, the following advantage is further obtained in addition to the above-mentioned various advantages possessed by the first embodiment 100A.

That is, since the wire harness 33 is entirely received in the harness receiving channel member 30 embedded in the vehicle floor 3, the wire harness 33 has no possibility of abruptly catching the foot of a passenger who is willing to take or leave the seat 1. Due to the same reason, external appearance of the vehicle floor 3 is improved.

Figure 10:
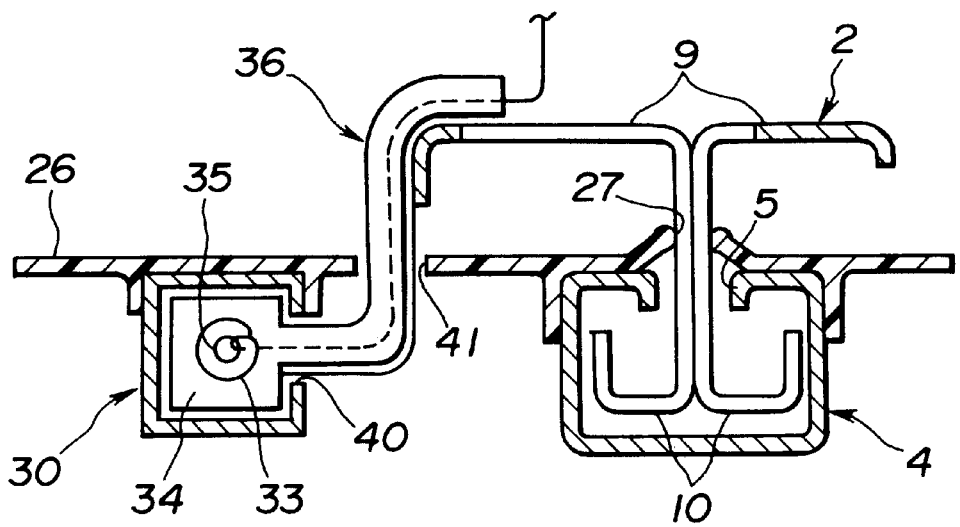
FIG. 10 is a sectional view of a rail unit which constitute a part of a power seat slide device of a fourth embodiment of the present invention.

Referring to FIG. 10, there is shown a rail unit which constitutes a part of a power seat slide device 100D of a fourth embodiment of the present invention. The device 100D is substantially the same as the above-mentioned third embodiment 100C except for the illustrated rail unit.

In this fourth embodiment, the harness receiving channel member 30 has at its outside wall an axially extending slit 40 through which the cranked bracket 36 of the rectangular plate 34 extends to the movable rail 2. The plastic cover 26 has a corresponding slit 41 through which the cranked bracket 36 passes, as shown. In this fourth embodiment, the interior of the harness receiving channel member 30 is protected from contamination.

Figure 11:
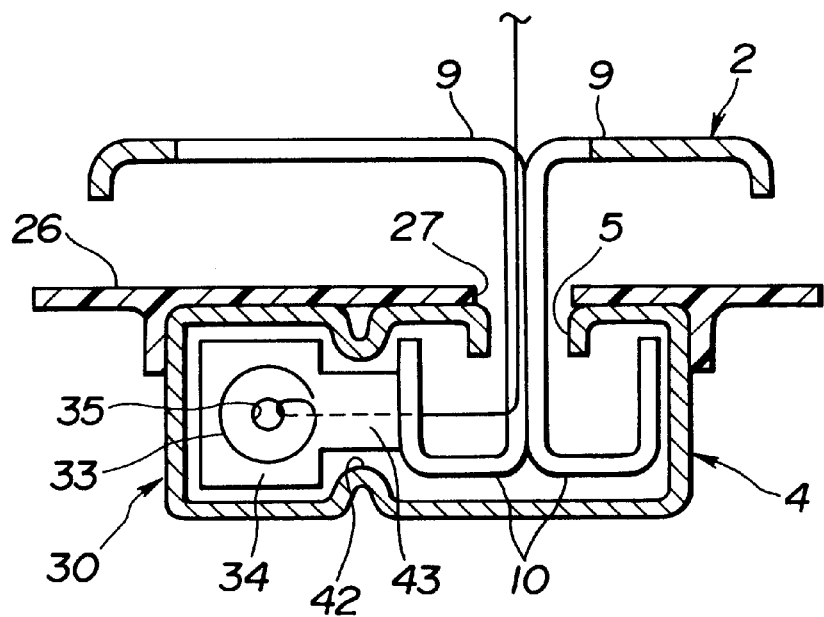
FIG. 11 is a view similar to FIG. 10, but showing a fifth embodiment of the present invention.

Referring to FIG. 11, there is shown a rail unit which constitutes a part of a power seat slide device 100E of a fifth embodiment of the present invention. The device 100E is substantially the same as the third embodiment 100C except for the illustrated rail unit.

In this fifth embodiment, the harness receiving channel member 30 is integral with the stationary rail 4. In other words, the stationary rail 4 is constructed to have a portion corresponding to the harness receiving channel member 30. A narrowed space 42 is defined in the integral rail unit, through which a connecting arm 43 from the rectangular plate 34 extends toward an inside part of the lower horizontal wall portion 10 of the movable rail 2 to be secured to the same. Much compact construction is obtained in this fifth embodiment.

What is claimed is:

1. A power seat slide device for a motor vehicle, comprising:
    a rail unit including a stationary rail adapted to be mounted to a floor of the vehicle and a movable rail slidably engaged with said stationary rail, said movable rail carrying thereon a seat;
    a twin gear member rotatably held by said movable rail, said twin gear member including a worm gear and a first crossed helical gear which are coaxially aligned;
    an elongate counterpart structure of said worm gear supported by said stationary rail, said counterpart structure extending along said stationary rail and meshedly engaged with said worm gear, so that rotation of said worm gear about its axis induces a straight-line movement of said movable rail relative to said stationary rail;
    an electric motor held by said movable rail; and
    a speed reduction gear unit held by said movable rail, said speed reduction gear unit being arranged between said electric motor and said first crossed helical gear in such a manner that the twin gear member is rotated by said electric motor through said speed reduction gear unit.

2. A power seat slide device as claimed in claim 1, in which said first crossed helical gear of said twin gear member is operatively engaged with a second crossed helical gear which is driven by said speed reduction gear unit.

3. A power seat slide device as claimed in claim 1, in which said speed reduction gear unit comprises:
    a first gear coaxially connected to said second crossed helical gear;
    a second gear meshed with said first gear;
    a shaft on which said second gear is tightly and concentrically disposed;
    a worm wheel tightly and concentrically disposed on said shaft; and
    another worm gear operatively meshed with said worm wheel, said another worm gear being driven by said electric motor.

4. A power seat slide device as claimed in claim 3, further including another rail unit having said speed reduction gear unit, said twin gear member, and said elongate counterpart structure, where said shaft also actuates said speed reduction gear unit of said another rail unit.

5. A power seat slide device as claimed in claim 2, in which said output worm wheel is arranged to rotate about an axis which extends perpendicular to an axis about which said twin gear member rotates.

6. A power seat slide device as claimed in claim 5, in which said counterpart structure is a rack member secured to said stationary rail.

7. A power seat slide device as claimed in claim 5, in which said counterpart structure comprises a plurality of equally spaced openings which are formed in said stationary rail.

8. A power seat slide device as claimed in claim 7, in which said openings are formed in a bottom wall of said stationary rail.

9. A power seat slide device as claimed in claim 8, in which said twin gear member is rotatably held by a vertical wall portion of said movable rail, said vertical wall portion being projected into a space defined by said stationary rail.

10. A power seat slide device as claimed in claim 7, in which said openings are formed in a side wall of said stationary rail.

11. A power seat slide device as claimed in claim 10, in which said twin gear member is rotatably held by a vertical wall member secured to said movable rail.

12. A power seat slide device as claimed in claim 1, in which said stationary rail is adapted to be entirely received in a groove formed in the vehicle floor and in which said movable rail has a lower horizontal wall portion slidably received in an axially extending space defined by said stationary rail.

13. A power seat slide device as claimed in claim 12, further comprising a plastic cover adapted to cover said vehicle floor except a portion where an axially extending slit of said stationary rail is located, said slit being a slit through which a vertical wall portion of said movable rail passes.

14. A power seat slide device as claimed in claim 12, further comprising:

- a harness receiving channel member adapted to be entirely received in a groove formed in the vehicle floor, said harness receiving channel member extending in parallel with said stationary rail;
- a spiral wire harness received in said harness receiving channel member, said wire harness having one end connected to an electric power source and the other end connected to said electric motor; and
- a bracket secured to said movable rail, said bracket having a plate slidably received in said harness receiving channel member, said plate having an opening through which said wire harness passes.

15. A power seat slide device as claimed in claim 14, in which said harness receiving channel member has at its upper wall an axially extending slit through which said bracket extends into the interior space of said harness receiving channel member.

16. A power seat slide device as claimed in claim 14, in which said harness receiving channel member has at its side wall an axially extending slit through which said bracket extends into the interior space of said harness receiving channel member.

17. A power seat slide device as claimed in claim 14, in which said harness receiving channel member is integrally connected with said stationary rail to constitute an integral rail unit, and in which said bracket is positioned in said integral rail unit to connect said plate with the lower horizontal wall portion of said movable rail.

* * * * *